United States Patent
Ratnakar

(10) Patent No.: US 11,658,960 B2
(45) Date of Patent: May 23, 2023

(54) APPARATUS AND METHOD FOR NETWORK SECURITY FOR DEVICES IN AN INTERNET OF THINGS (IOT) NETWORK

(71) Applicant: Nitesh Ratnakar, Bowden, WV (US)

(72) Inventor: Nitesh Ratnakar, Bowden, WV (US)

(*) Notice: Subject to any disclaimer, the term of this patent is extended or adjusted under 35 U.S.C. 154(b) by 584 days.

(21) Appl. No.: 16/515,737

(22) Filed: Jul. 18, 2019

(65) Prior Publication Data
US 2021/0021582 A1   Jan. 21, 2021

(51) Int. Cl.
*H04L 9/40* (2022.01)
*H04W 12/06* (2021.01)
*H04B 1/00* (2006.01)

(52) U.S. Cl.
CPC ......... *H04L 63/083* (2013.01); *H04B 1/0064* (2013.01); *H04W 12/06* (2013.01)

(58) Field of Classification Search
CPC .......... G06F 21/34; G06F 21/35; G06F 21/44; H04L 63/083; H04W 12/06
See application file for complete search history.

(56) References Cited

U.S. PATENT DOCUMENTS

| | | | | |
|---|---|---|---|---|
| 7,245,213 B1* | 7/2007 | Esterberg | ............ | H04L 63/0492 235/382 |
| 9,198,044 B2* | 11/2015 | Solondz | ............... | H04L 9/006 |
| 9,807,202 B2* | 10/2017 | Baumgarte | ........... | H04W 12/50 |
| 10,142,464 B1* | 11/2018 | Cairns | ................ | H04M 3/493 |
| 10,333,946 B1* | 6/2019 | Hitchcock | ........... | H04L 63/0846 |
| 10,692,068 B2* | 6/2020 | Misek | ................... | H04B 11/00 |
| 2002/0147930 A1* | 10/2002 | Pritchard | .............. | G06F 21/31 726/5 |
| 2006/0156385 A1* | 7/2006 | Chiviendacz | ......... | H04L 9/3271 726/2 |
| 2007/0024506 A1* | 2/2007 | Hardacker | ............. | H01Q 25/00 343/786 |
| 2008/0258991 A1* | 10/2008 | Montgomery | ......... | H01Q 21/28 343/844 |
| 2012/0139806 A1* | 6/2012 | Zhan | .................... | H01Q 21/28 343/770 |
| 2013/0061298 A1* | 3/2013 | Longobardi | ............ | G06F 21/42 726/6 |
| 2013/0156181 A1* | 6/2013 | Baek | ..................... | H04L 9/0875 380/44 |

(Continued)

OTHER PUBLICATIONS

M. Adil, M. Attique, M. M. Jadoon, J. Ali, A. Farouk and H. Song, "HOPCTP: A Robust Channel Categorization Data Preservation Scheme for Industrial Healthcare Internet of Things," in IEEE Transactions on Industrial Informatics, vol. 18, No. 10, pp. 7151-7161, Oct. 2022. (Year: 2022).*

(Continued)

*Primary Examiner* — Kari L Schmidt
(74) *Attorney, Agent, or Firm* — Kenyon Jenckes

(57) ABSTRACT

A transmitter in an Internet of Things (IoT) network parses an authentication credential into different portions and assigns each portion to one of multiple pre-determined frequency channels for transmission. A receiver for which the authentication credential is intended first authenticates that the different portions of the authentication credential are sent on the pre-determined frequency channels. The receiver then compiles the portions and authenticates the authentication credential.

15 Claims, 8 Drawing Sheets

(56) References Cited

U.S. PATENT DOCUMENTS

| | | | |
|---|---|---|---|
| 2015/0327069 A1* | 11/2015 | Fu | H04W 76/10 |
| | | | 726/5 |
| 2016/0013855 A1* | 1/2016 | Campos | H04L 27/2601 |
| | | | 370/343 |
| 2016/0086406 A1* | 3/2016 | Baumgarte | G06K 19/0724 |
| | | | 340/5.7 |
| 2018/0139708 A1* | 5/2018 | Zhan | H04L 12/413 |
| 2018/0301007 A1* | 10/2018 | Seong | H04N 7/12 |
| 2018/0351942 A1* | 12/2018 | Ji | G06Q 20/0655 |
| 2018/0367528 A1* | 12/2018 | Schwarz | H04L 63/08 |
| 2019/0174304 A1* | 6/2019 | Tunnell | H04W 12/50 |

OTHER PUBLICATIONS

Meng, Yan, et al. "Wivo: Enhancing the security of voice control system via wireless signal in iot environment." Proceedings of the eighteenth ACM international symposium on mobile ad hoc networking and computing. 2018, pp. 81-90. (Year: 2018).*

\* cited by examiner

APPARATUS AND METHOD FOR NETWORK SECURITY FOR DEVICES IN AN INTERNET OF THINGS (IOT) NETWORK

TECHNICAL FIELD

Systems and techniques for network security are provided, in particular, security for communications between devices in an Internet of Things (IoT) network.

BACKGROUND

The Internet of Things (IoT) is a conceptual framework that extends Internet connectivity into physical devices and everyday objects. These devices are embedded with electronics, including, e.g., sensors and RFID (Radio Frequency Identification) chips, and enabled with Internet connectivity to communicate and interact with other devices over the Internet. These IoT devices can be remotely monitored and controlled with or without out human interaction, i.e., using machine-to-machine (M2M) communications.

IoT technology has been adapted for use in a variety of markets. For example, in the consumer market, IoT technology has been used to enable the concept of a "smart home," which may include a number of common devices and appliances including lighting fixtures, thermostats, home security systems and cameras, and other home appliances with a high degree of control and integration. A user can control and/or program the connected devices based on a current desire while in the home or based on a user preference when outside of the home using devices with convenient user interfaces (UIs) connected to the IoT home network, e.g., via smartphones and/or smart speakers or other "smart home"-type hubs.

IoT has found uses in other markets as well. In commercial markets, IoT networks are used in healthcare, item tracking and monitoring, and home automation. Industrial applications for IoT include manufacturing, equipment monitoring, and agriculture. On an infrastructure scale, IoT technology has found applications in city-wide deployments, efficient energy distribution, and environmental monitoring.

The IoT platform has faced various criticisms, in part due to the lack or current standardization, but especially in regards to privacy and security concerns. Some potential users are distrustful of sensitive issues like confidentiality, authenticity, and integrity of data being sensed, possibly recorded, and exchanged by solely machines. Also, as the networked systems increase in size, complexity, and integration, new security issues arise.

One well-publicized security failure in an IoT network involved the hacking of a Las Vegas casino in 2017 through its Internet-connected thermometer in an aquarium in the lobby of the casino (see, e.g., https://money.cnn.com/2017/07/19/technology/fish-tank-hack-darktrace/index.html). The hackers exploited a vulnerability in the thermostat to gain access to the entire network. They were able to access a "high-roller" database of gamblers and extract it from the network through the thermostat.

Because of these and similar issues, the adoption of IoT technology faces obstacles with regard to consumer and larger scale acceptance. Accordingly, there is a need for increased security and privacy available for users of IoT technologies in view of the new challenges inherent to the relatively new technology.

SUMMARY

In an embodiment, a network security system includes a transmitter and a receiver. Both the transmitter and receiver may be transceivers including multiple antennas, such as in multiple-in multiple-out (MIMO) configuration, and capable of sending and receiving data over multiple frequencies and/or data streams.

A transceiver, e.g., one used as a transmitter, may include a processor capable of parsing an authentication credential, e.g., a user-selected password, into different portions and assign each different portion to a different pre-determined frequency channel for transmission.

A transceiver in the system, e.g., one used as a receiver, may include a processor capable of authenticating that portions of the authentication credential are received on pre-determined frequency channels. The processor may then compile the portions of the authentication credential in a proper sequence, and then authenticate the authentication credential.

Each antenna may be configured to transmit or receive data on a different frequency channel, for example, one antenna on a 2.4 GHz frequency channel associated with IEEE 802.11 (WiFi) communications, and other antenna(s) configured to receive data on another frequency channel, e.g., associated with another wireless communication protocol.

In an embodiment, the processor at the receiver may be configured to compile the portions of the authentication credential based on executable code. The executable code may be transmitted by the receiver over the antennas and received by the multiple antennas at the receiver. In another embodiment, a number of executable code having different protocols for compiling the portions of the authentication credential may be stored locally at the receiver and selected based on a schedule known by both the transmitter and receiver and changed, for example, based on a predetermined time criteria such as a date, number of hours, minutes, etc., or some combination thereof.

DETAILED DESCRIPTION

Figure 1:
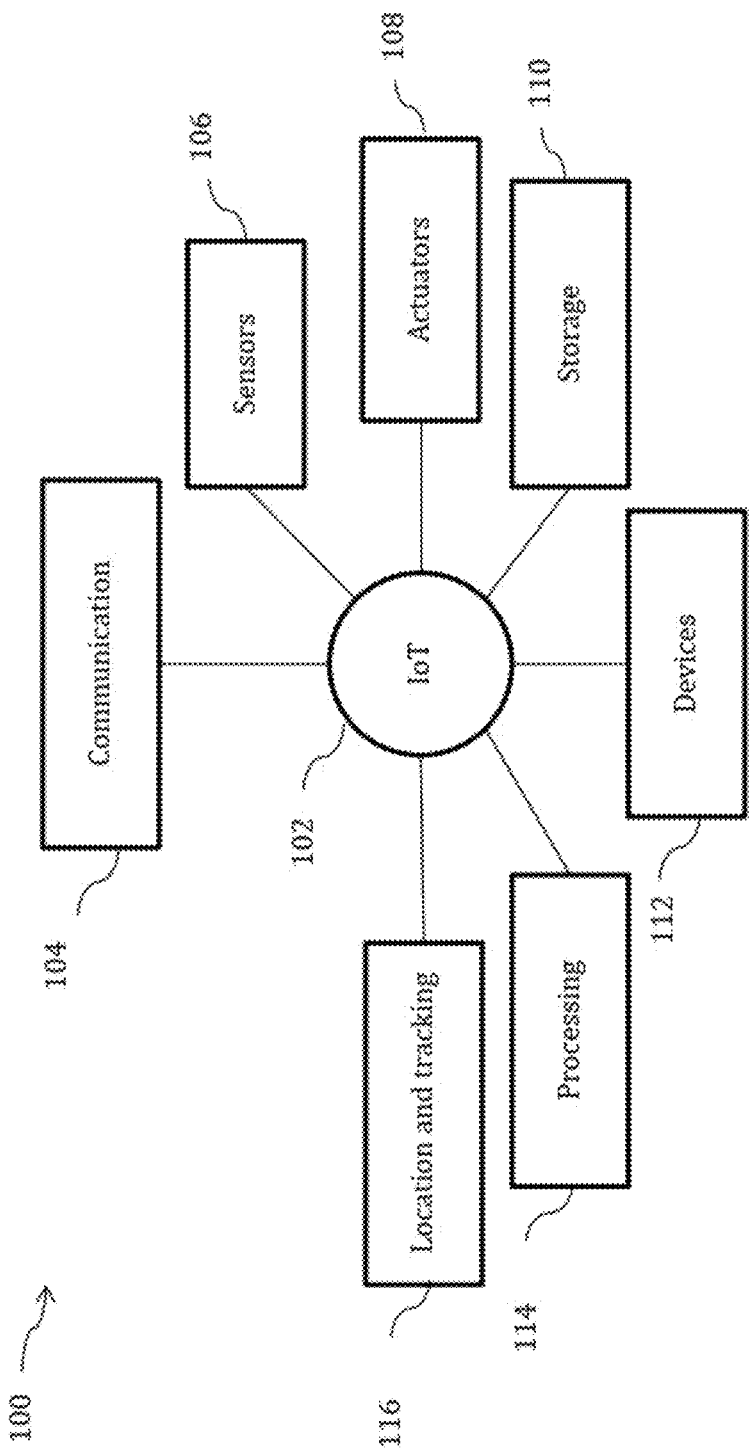
FIG. 1 shows components of an exemplary IoT network.

FIG. 1 shows components of an exemplary IoT network 100. The modules presented only provide an example of the potential scope of an IoT network, and are not exhaustive. Various modules may be omitted and others added depending on the intended purpose of the IoT system, e.g, consumer, commercial, industrial, or infrastructure.

In this example, an IoT hub 102 is connected to multiple devices and services. A communication module 104 enables information exchange between devices in the IoT network. Various communication techniques and protocols may be used, including local wired (e.g., Ethernet), domestic wireless (e.g., IEEE 802.11), and cellular networks (e.g., 4G/LTE or 5G). Various sensors 106 may be embedded in different IoT devices depending on their purpose. For example, a smart phone may include video and audio sensors, and a smart watch may include temperature and acceleration sensors. Both may provide access to positioning (GPS) information. Actuators 108 may be used to enable physical actions, such as triggering hardwired systems such as lighting and opening/closing and locking/unlocking doors in a commercial setting, or more complex devices in commercial and industrial IoT networks.

Storage devices 110 may be provided for data collection from the various components, and a processing module 112 may be used to provide data mining and related services A variety of devices 114 may be used for user interaction and monitoring, such as smart phones, smart speakers, and smart watches for personal use, and kitchen appliances, home security, and environmental control for "smart home" applications.

Location and tracking services 116 may be used for a variety of purposes, including personal use, e.g. for tracking exercise of finding directions, commercial applications, e.g., parcel and vehicle tracking, etc.

Figure 2:
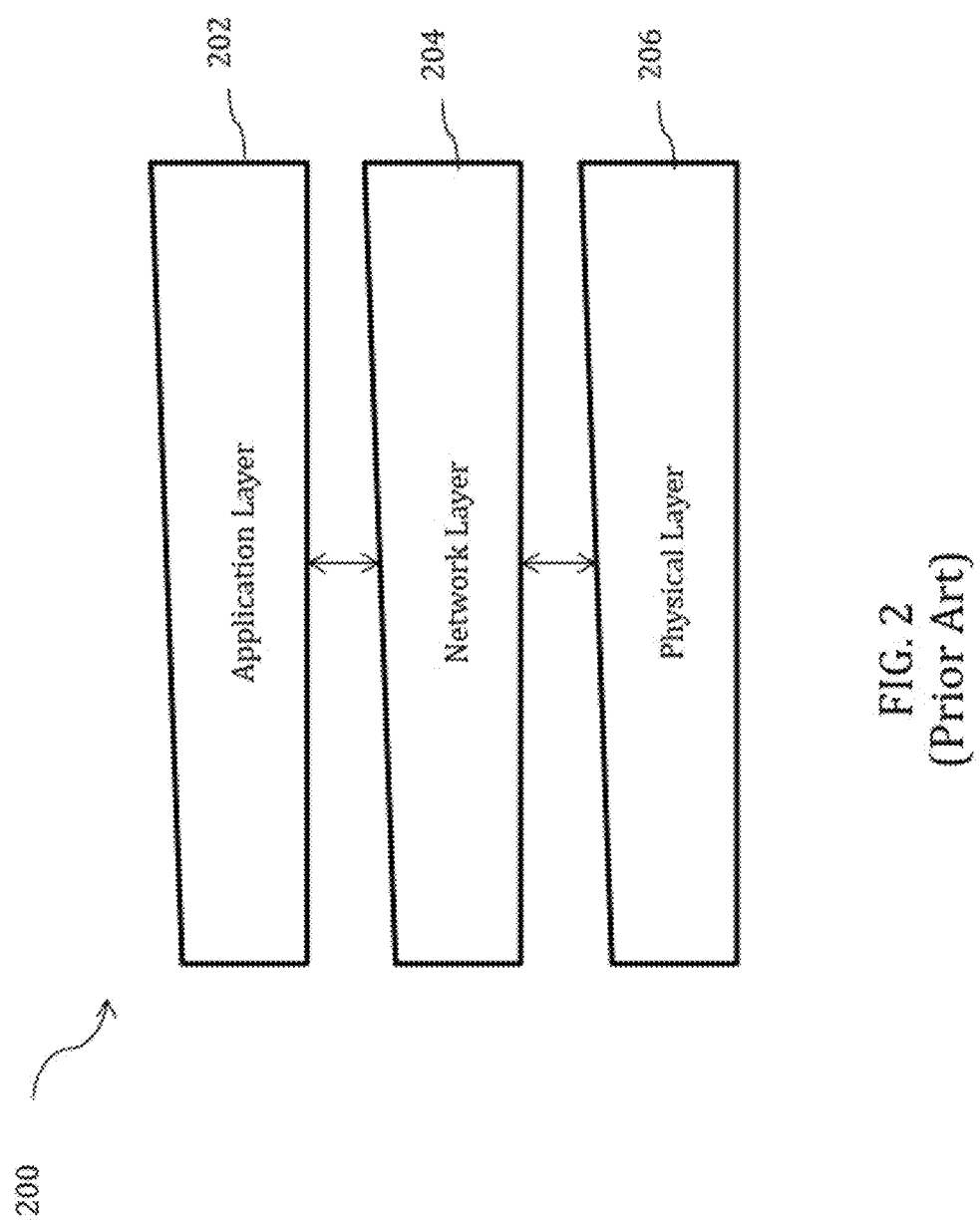
FIG. 2 shows the layers of an IoT network architecture.

IoT networks may utilize different means for connecting to the Internet, and share a common networking architecture 200, as shown in FIG. 2.

The bottom layer of the architecture is the physical layer 202. This layer is mainly responsible for performing device identification and providing service discovery. In order to be considered an IoT device, the device must be able to employ communication technology that enables connection to other IoT devices either directly or indirectly using the Internet, e.g., via Ethernet (IEEE 802.3), a Wi-Fi connection (IEEE 802.11), or a Bluetooth connection (IEEE 802.15). Each device may have a unique identifier that allows it to connect successfully to the network, such as a Universally Unique identifier (UUID).

The network layer 204 may include network interfaces, communication channels, network management, and information maintenance. The network layer is mainly responsible for the communication and connectivity of all the devices in IoT system through multiple communication protocols.

The application layer 206 ensures the same type of service among the connected devices. It can store data into a database, and provide storage capabilities for the collected data. The application layer also facilitates ways for devices in the IoT network to communicate outside of the device-oriented basis of the IoT, e.g., with the user(s) through UIs.

There are many potential security and privacy risks inherent in an IoT network. Due to the sheer number of devices that can be potentially linked to an IoT network, and the sensors they may incorporate, consumers may feel they are being spied on by the devices in their own homes. In addition to the usual suspects, e.g., smart phones, tablets, and smart watches, which may include cameras, speakers, location sensors, and personal data, with the addition of IoT, their kitchen appliances, security measures such as cameras and motion sensors, and even thermostats, become suspect.

Furthermore, computer-controlled devices in automobiles, such as brakes, engine, door and hood locks, and heating have been shown to be vulnerable to attackers who have access to the on-board network, and those systems that are Internet-connected may be vulnerable to remote attackers. With regards to personal healthcare and monitoring IoT networks, hackers have demonstrated the ability to remotely control insulin pumps and implantable cardioverter defibrillators. Many of these IoT devices have severe operational limitations on their physical size and computational power, making them unable to directly use basic security measures such as implementing firewalls or using strong encryption for their communications with other devices.

Figure 3:
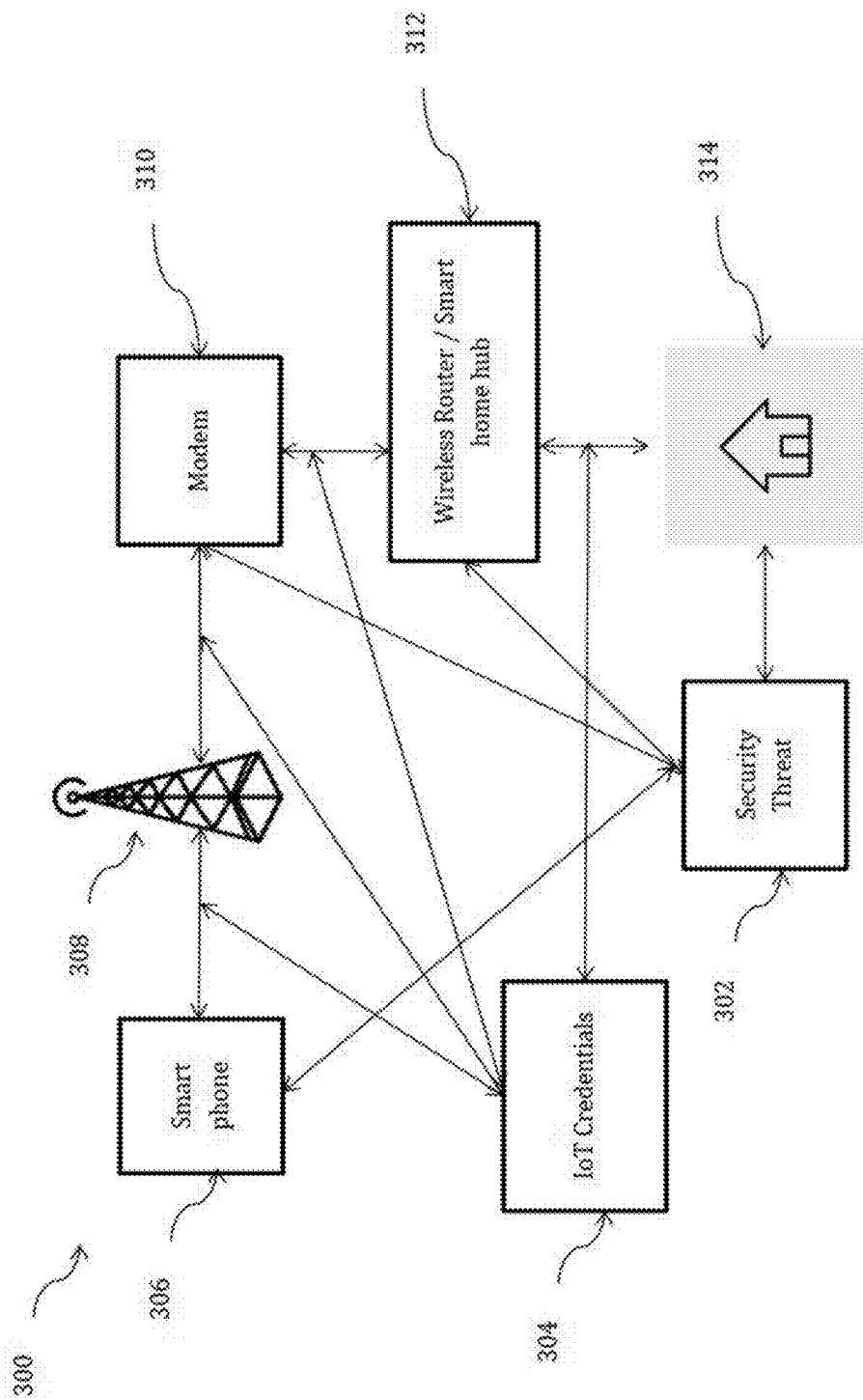
FIG. 3 illustrates potential risk scenarios for an IoT network.

FIG. 3 shows potential points of attack for a network security threat to an IoT network 300, in this case, a hacker 302. The hacker may gain access to the user's IoT authentication credentials 304, e.g., passwords, from the user's smart device 306, network service provider 308, home modem 310, smart home hub/wireless router 312, or IoT device 314. The user's individual responsibility for network security begins at the home modem level. The modem may also serve as a convenient point of access for a hacker, in that it may lack the more sophisticated security measures employed by the network service provider.

Figure 4:
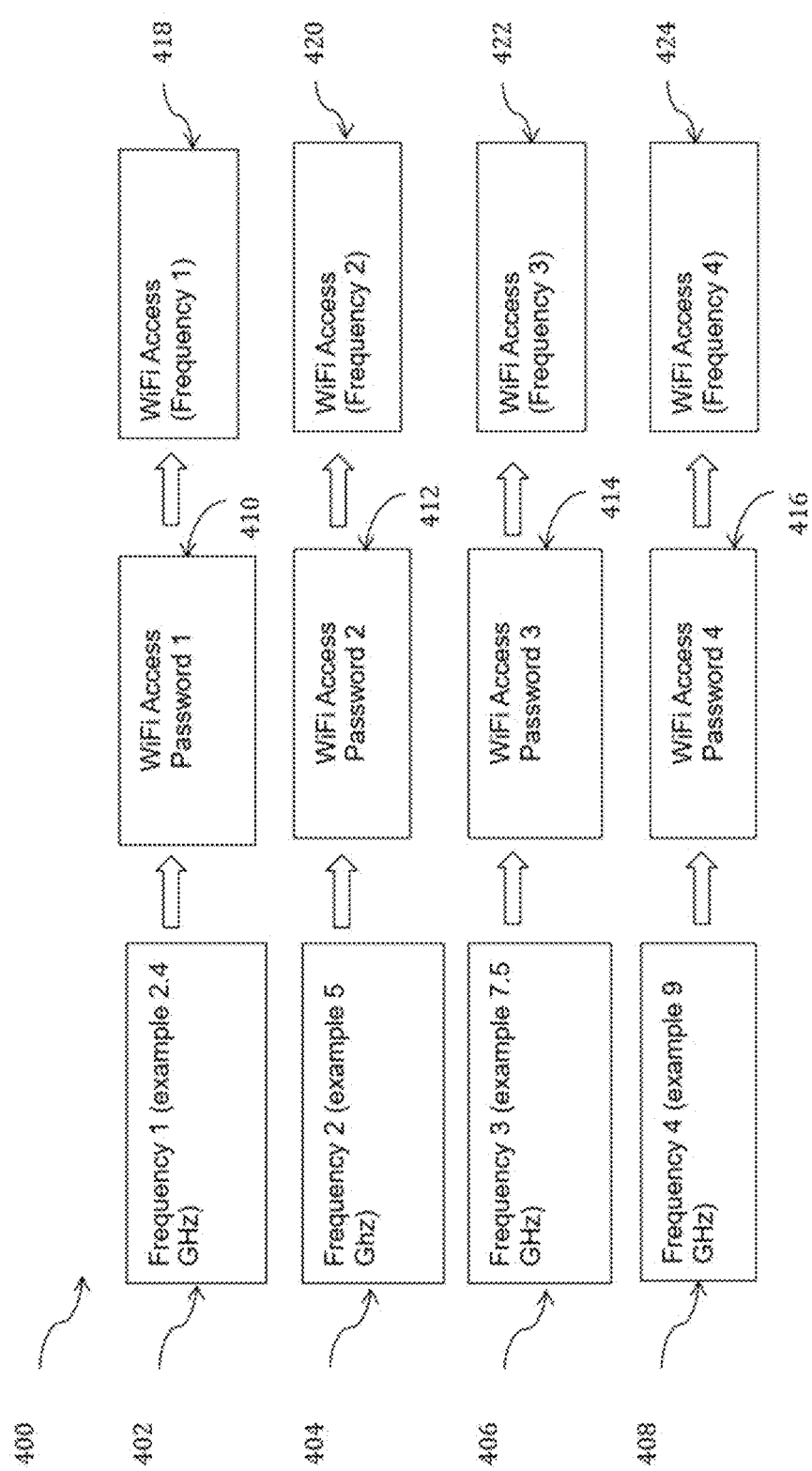
FIG. 4 shows an exemplary embodiment in which authentication credentials are parsed and transmitted over different frequency channels.

The 5G telecommunications model, which at this time is still in development, envisions integration with IoT devices over a number of different frequencies. FIG. 4 shows an exemplary embodiment of an IoT network security technique 400 in which authentication credentials are transmitted over different frequencies available to devices in the IoT network in order to provide enhanced security. FIG. 4 is described in conjunction with FIG. 5, which is a flowchart 500 describing the exemplary authentication and data transmission procedure.

In this example, a password for authenticating an IoT connected device with a smart home hub/wireless route is parsed by a transmitter in 502, in this case, the smart home hub/wireless router 312, and sent on four different predetermined frequency channels 402 (2.4 GHz), 404 (5 GHz), 406 (7.5 GHz), and 408 (9 GHz). Partial passwords 410, 412, 414, and 416 are transmitted on frequency channels 402, 404, 406, and 408, respectively in 504 and received at the receiver in 506. The frequency channel serves as authentication for the receiver, in this case, an IoT device, of the partial passwords. The partial passwords are then compiled 510 for authentication of the transmitter. Once compiled and authenticated, Wifi access is granted on the four pre-determined frequency channels 418, 420, 422, and 424.

After authentication, the transmitter and receiver may exchange data 512, including information from the IoT device sensors and instructions from the smart home hub/wireless router, using the same frequency channels and parsing and compilation algorithms 514, 516.

Figure 5:
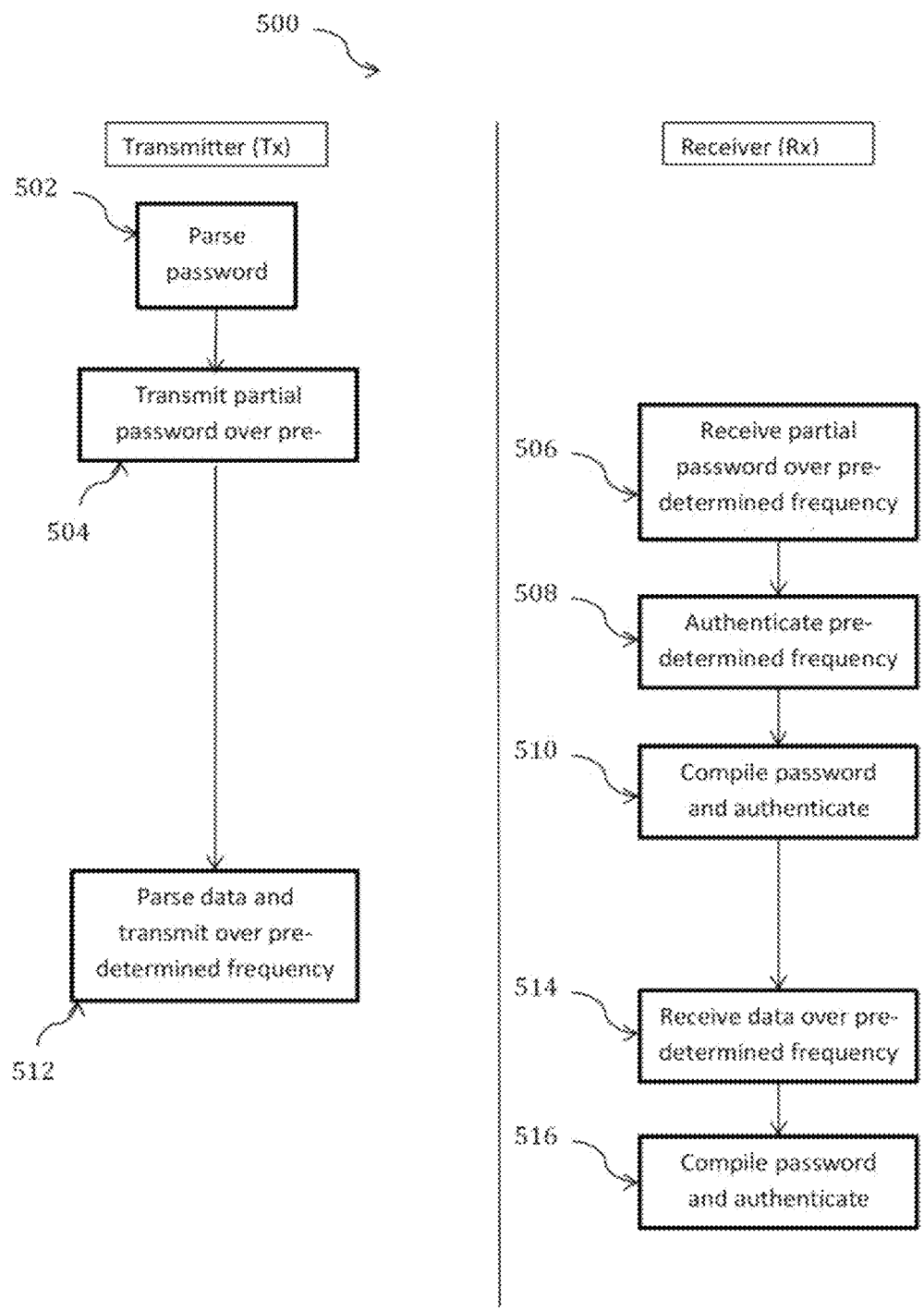
FIG. 5 is a flowchart describing an exemplary technique for enhanced security in an IoT network according to the embodiment of FIG. 4.

It should be understood that the flowchart in FIG. 5 may take place simultaneously and/or in different orders as shown. The transmitter and receiver may use methods with additional steps, fewer steps, and/or different steps, so long as the methods remain appropriate.

Although the example describes the smart home hub/wireless router as a transmitter and the IoT device as a receive, both devices, as well as the modem, include transmitter an receiver components. Thus, the authentication procedure and data transmission can occur in reverse order.

Although this example includes four frequency channels, more or less frequency channels may be used. Also, the authentication technique may be used between the smart home hub/wireless router and individual IoT devices, or between the modem and smart home hub/wireless router.

The authentication credentials may be passwords generated by the user and then assigned to frequency channels, or may be generated automatically, e.g., during an initial setup, and communicated between the transmitter and receiver, along with predetermined frequency channels and parsing/compilation algorithms.

The authentication credentials and/or data may be sent simultaneously in individual data streams on different frequency channels. Alternatively, the credentials and/or data may be sent sequentially, depending on the configuration of the transmitter and receiver antenna systems. Partial passwords can be stored in memory for later processing.

Figure 6:
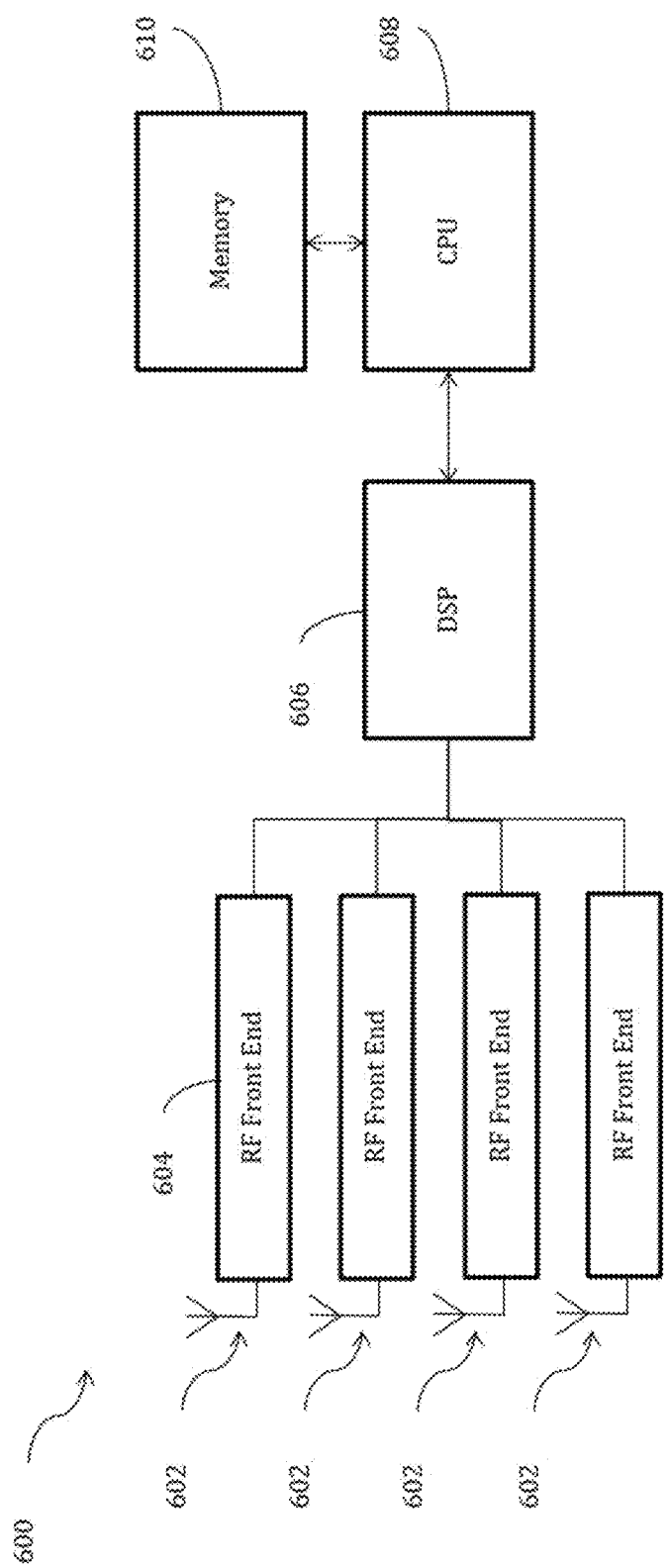
FIG. 6 is a block diagram showing the components of transmitters and receivers in an exemplary IoT network with enhanced security according to an embodiment.

FIG. 6 is a block diagram showing the components of an exemplary transmitter/receiver 600 in an exemplary IoT network with enhanced security according to an embodiment. The parsed passwords and data may be sent and received on different antennas 602 and converted to baseband signals by a connected RF front-end chains 604. The converted signals are processed by a digital signal processor 606. Parsing and compilation of the passwords and data may be performed at processor 608, and data stored in memory 610 during authentication.

Figure 7A:
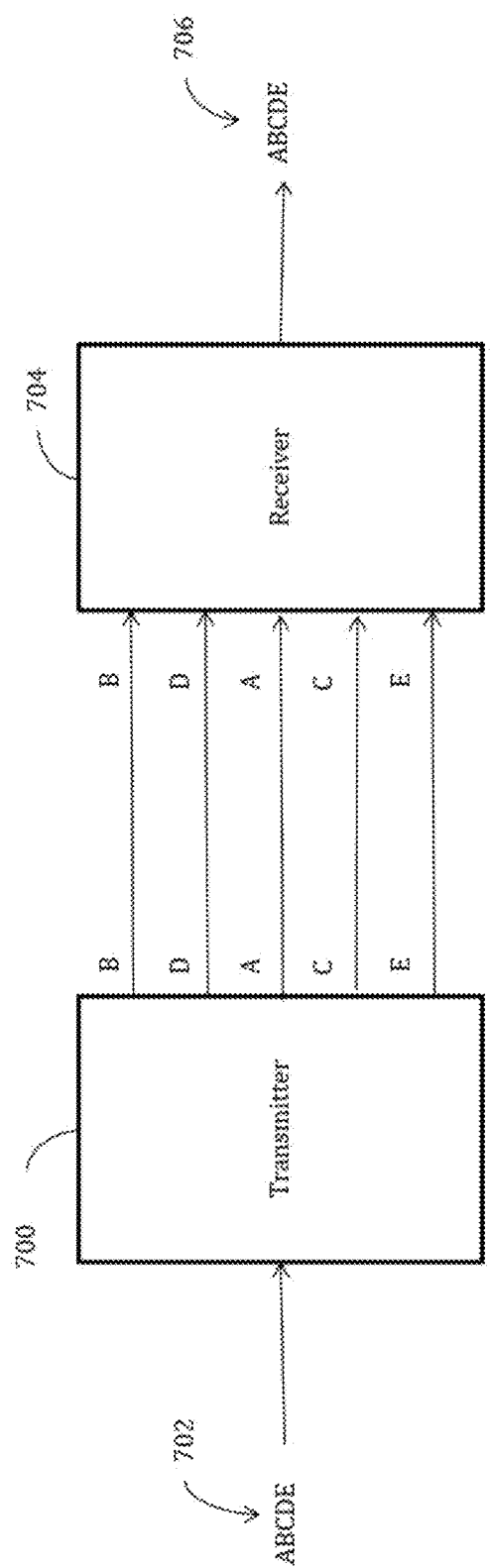
FIGS. 7A and 7B illustrate embodiments in which a transmitter may dynamically transmit incoming data to a receiver.
Figure 7B:
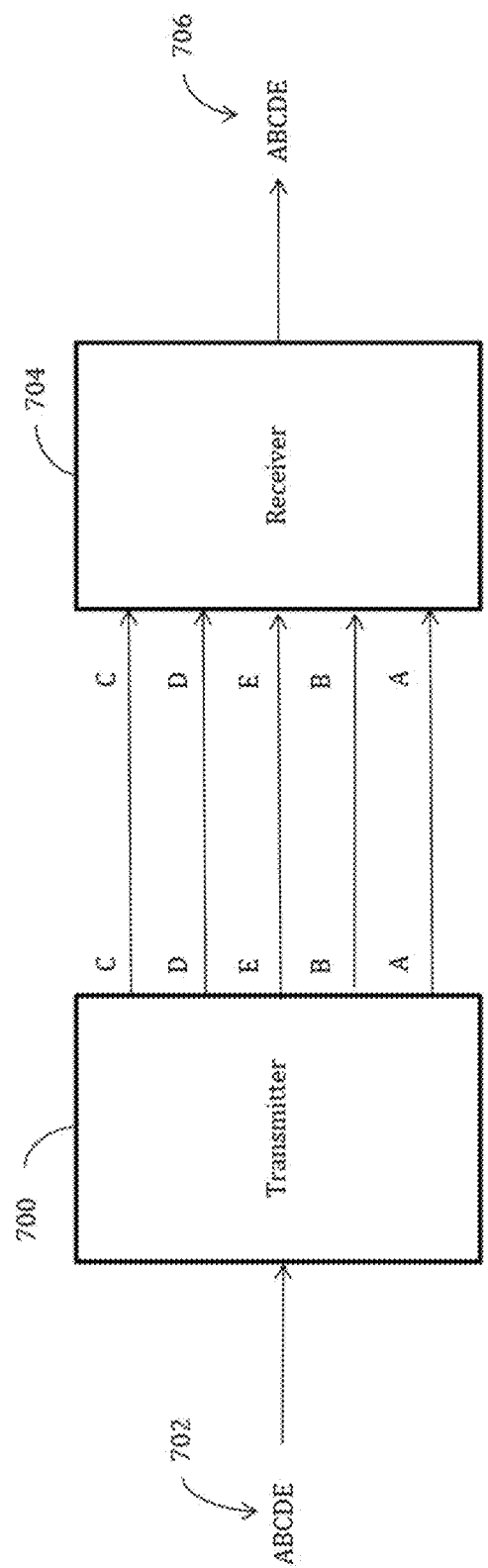

FIGS. 7A and 7B illustrate embodiments in which a transmitter 700 may dynamically transmit incoming data 702 to a receiver 704. The incoming data 702 may be parsed by the transmitter 700 in a pre-programmed or random order. FIGS. 7A and 7B illustrate that the incoming data can be parsed into different patterns on different frequencies and/or data streams, e.g., ABCDE→BDACE and CDEBA, respectively, and properly recombined at the receiver 704.

In an embodiment, the transmitter 700 may be programmed with executable computer code to transmit a packet of executable code to the receiver. The receiver 704, upon receiving the data, may combine the data over different frequencies and/or data streams into an executable data packet, which may then be properly combined into received data 706.

The executable code that instructs the receiver 702 on how to combine the incoming data may either reside in the receiver or be transmitted to the receiver by the transmitter 700 in a dynamic fashion. For example, the proper executable code to re-combine the received data may be changed based on a schedule known by both the transmitter 702 and receiver 704 and changed, for example, based on a time such as a date, number of hours, minutes, etc., or some combination thereof.

The antennas may have multi-antenna structure, e.g., a multi-input multi-output (MIMO) antenna system. The multi-antenna system may include two or more antennas and scaled for the application, e.g., consumer, commercial, industrial, or infrastructure.

Having described and illustrated the principles of our invention with reference to described embodiments, it will be recognized that the described embodiments may be modified in arrangement and detail without departing from such principles.

In view of the many possible embodiments to which the principles of our invention may be applied, I claim as our invention all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The detailed description is presented to enable a person of ordinary skill in the art to make and use the invention and is provided in the context of the requirement for obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

The invention claimed is:

1. An apparatus comprising:
a transceiver operative to receive all portions of a complete sequenced authentication credential received from a single device, the authentication credential including at least three parsed portions, the transceiver including
a plurality of antennas, wherein each of said plurality of antennas is configured to receive a different one of said plurality of parsed portions on a distinct predetermined frequency channel assigned to said antenna, wherein each of said antennas and the corresponding parsed portion is assigned a different and distinct predetermined frequency from each of said other antennas and corresponding parsed portions, wherein each of said predetermined frequency channels is separated from any of the other predetermined frequency channels by at least one gigahertz; and
a processor configured to
authenticate that each portion of the complete sequenced authentication credential is received on the predetermined frequency channel assigned to said portion,
compile the portions into a correctly sequenced and complete authentication credential, and
authenticate the complete authentication credential.

2. The apparatus of claim 1, wherein the authentication credential is a user-selected password.

3. The apparatus of claim 1, wherein at least one of the frequency channels comprises a 2.4 GHz frequency channel.

4. The apparatus of claim 1, wherein the processor is further configured to compile the portions of the authentication credential based on executable-code.

5. The apparatus of claim 4, wherein the processor is further configured to receive the executable code from the plurality of antennas.

6. The apparatus of claim 4, further comprising a local storage device, and wherein the processor is further configured to select the executable code from a plurality of available executable code stored on the local storage device based on a predetermined time criteria.

7. The apparatus of claim 1, wherein the at least three different parsed portions of the sequenced authentication credential transmitted on the at least three different and distinct predetermined frequency channels are received simultaneously from the single device.

8. The apparatus of claim 1, wherein all portions of a complete sequenced authentication credential are received from the single device simultaneously.

9. A method comprising:
 at a transceiver comprising a plurality of antennas, receiving all of a plurality of parsed portions of a complete sequenced authentication credential including at least three parsed portions from a single device, wherein each of the plurality of antennas is configured to receive a different one of said plurality of parsed portions corresponding to said antenna on a predetermined frequency channel assigned to said antenna and the corresponding parsed portion, wherein each parsed portion is received from a single device on a different and distinct predetermined frequency channel from the other of said parsed portions, wherein each of said predetermined frequency channels is separated from any of the other predetermined frequency channels by at least one gigahertz;
 authenticating that each of the portions of the authentication credential is received on the assigned predetermined frequency channel for said portion;
 compiling the parsed portions into a correctly sequenced and complete authentication credential; and
 authenticating the complete authentication credential.

10. The method of claim 9, wherein the authentication credential is a user-selected password.

11. The method of claim 9, wherein said receiving comprises receiving data on a different frequency channel from a different antenna.

12. The method of claim 9, wherein at least one of the frequency channels comprises a 2.4 GHz frequency channel.

13. A non-transitory computer readable medium having stored thereon instructions that, when executed by a processor, cause the processor to:
 receive at a transceiver comprising a plurality of antennas, all of a plurality of parsed portions of a complete sequenced authentication credential including at least three parsed portions from a single device, wherein each of the plurality of antennas is configured to receive a different one of said plurality of parsed portions corresponding to said antenna on a predetermined frequency channel assigned to said antenna and the corresponding parsed portion, wherein each parsed portion is received from a single device on a different and distinct predetermined frequency channels from the other of said parsed portions, wherein each of said predetermined frequency channels is separated from any of the other predetermined frequency channels by at least one gigahertz;
 authenticate that each of the portions of the authentication credential is received on the assigned predetermined frequency channel;
 compile the parsed portions into a correctly sequenced and complete authentication credential; and
 authenticate the complete authentication credential.

14. The non-transitory computer readable medium of claim 13, wherein the authentication credential is a user-selected password.

15. The non-transitory computer readable medium of claim 13, wherein at least one of the frequency channels comprises a 2.4 GHz frequency channel.

* * * * *